United States Patent
Küpper et al.

[11] Patent Number: 4,859,790
[45] Date of Patent: Aug. 22, 1989

[54] ESTERS OF 3-TERT-BUTYL- AND 3-TERT-BUTYL-5-ALKYL-4-HYDROXYPHENYL (ALKANE) CARBOXYLIC ACIDS WITH OXETHYLATES OF POLYHYDROXYAROMATICS, PROCESS FOR THEIR PRODUCTION, AND THEIR USE AS STABILIZERS

[75] Inventors: Friedrich-Wilhelm Küpper, Marl; Heinz-Werner Voges, Dorsten; Werner Pätzold, Gladbeck; Richard Schaaf, Haltern, all of Fed. Rep. of Germany

[73] Assignee: Huels Aktiengesellschaft, Marl, Fed. Rep. of Germany

[21] Appl. No.: 122,722

[22] Filed: Nov. 18, 1987

[30] Foreign Application Priority Data
Nov. 18, 1986 [DE] Fed. Rep. of Germany ....... 3639383

[51] Int. Cl.$^4$ ............................................. C07C 69/88
[52] U.S. Cl. .................................... 560/75; 8/DIG. 9
[58] Field of Search ............................................ 560/75

[56] References Cited

U.S. PATENT DOCUMENTS 3,984,460 10/1976 Spivack ................................. 560/67
4,417,071 11/1983 Rosenberger ......................... 560/75

FOREIGN PATENT DOCUMENTS 875027 7/1979 Belgium.
2901630 7/1980 Fed. Rep. of Germany.
78595 7/1978 Netherlands.

*Primary Examiner*—Paul J. Killos
*Attorney, Agent, or Firm*—Millen, White & Zelano

[57] ABSTRACT

Esters of 3-tert-butyl- and 3-tert-butyl-5-alkyl-4-hydroxyphenyl(alkane) carboxylic acids of Formula I where
$R_1 = C(CH_3)_3$,
$R_2 = H$, $C_1$—to $C_4$-Alkyl, preferably—$C(CH_3)_3$,
$m = 0$ to 4, preferably 2

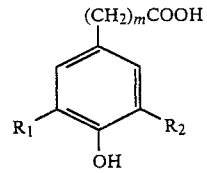

(I)

with oxethylates of polyhydroxyaromatics of 2–6 hydroxy groups of general Formulae II and III, containing 1–6 oxethylate units,

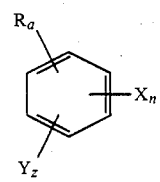

(II)

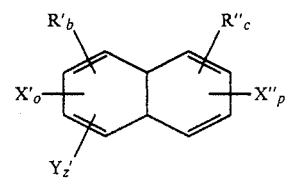

(III)

with
$X = (CH_2)_qOH$
$X' = (CH_2)_rOH$
wherein q, r, s can be 0 or 1, preferably 0,
$X'' = (CH_2)_sOH$
$R, R', R'' = H$, alkyl, halogen,

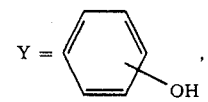

$Y =$ preferably 4-hydroxyphenyl,
$n = 2$ to 6 for z or $z' = 0$, preferably 2 or 3, and
$n = 1$ to 5 for z or $z' \neq 0$, preferably 2 or 3,
$o + p = n$
$0 \leq a$, $z \leq a + z \leq 6 - n$   (in Formula II)
$0 \leq b$, $c$, $z' \leq 4 \leq 8 - n$   (in Formula III).
are useful for the stabilization of polymers.

16 Claims, No Drawings

ESTERS OF 3-TERT-BUTYL- AND 3-TERT-BUTYL-5-ALKYL-4-HYDROXYPHENYL (ALKANE) CARBOXYLIC ACIDS WITH OXETHYLATES OF POLYHYDROXYAROMATICS, PROCESS FOR THEIR PRODUCTION, AND THEIR USE AS STABILIZERS

BACKGROUND OF THE INVENTION

The present invention relates to esters of 3-tert-butyl- and 3-tert-butyl-5-alkyl-4-hydroxyphenyl (alkane) carboxylic acids, their preparation and their use as polymer stabilizers.

It is known that organic polymers as obtained by polymerization (or copolymerization) of mono- and diolefins, optionally containing functional groups, or by polycondensation of suitable precursors—for example, of diols with dicarboxylic acids—can suffer changes under the effect of air/oxygen, of heat, of light, or of high-energy radiation; these changes impair the properties of the polymers important in their practical usage, such as strength, hardness and elongation. On account of such impairments, there is frequently not only a marked change in measurable physical properties, but visually noticeable softening, brittleness and/or discoloration of the finished articles also occur. For this reason, stabilizers are added to the corresponding polymers prior to processing. For more details, see the review publications by G. Scott, "Atmospheric Oxidation and Antioxidants", Elsevier Publ. Co., Amsterdam, Oxford, N.Y. (1965); R. Gächter, H. Müller, "Taschenbuch der Kunststoff-Additive" [Pocket Manual of Plastics Additives], C. Hanser Publishers, Munich/Vienna (1979); J. Pospisil in "Degradation and Stabilization of Polymers" (Edit.: H. Jellinek), Elsevier, Amsterdam, Oxford, N.Y. (1983), pp. 193 et seq.; P. P. Klemchuk et al., "Polymer Degradation and Stabilization" 7: 131 et seq. (1984).

It is also known that in case of polyolefins, compounds containing phenolic hydroxy groups are preferably utilized as stabilizers, and that, among these phenol derivatives, materials having voluminous alkyl groups, preferably with tert-butyl substituents, in at least one ortho position with respect to the phenolic hydroxy group, exhibit a particularly high efficacy. Esters can also be found among the large number of stabilizers disclosed (compare, for example, J. C. Johnson, "Antioxidants", Noyes Data Corp., 1975; M. W. Ramsey, "Antioxidants—Recent Developments", Noyes Data Corp., 1979; M. T. Gillies, "Stabilizers for Synthetic Resins", Noyes Data Corp., Park Ridge, N.J., 1983). Esters of 3,5-dialkyl-4-hydroxyphenyl(alkane) carboxylic acids are described, for example, in U.S. Pat. Nos. 3,681,431; 3,330,859; 3,644,482; 3,285,855; esters of 4,6-dialkyl-3-hydroxyphenyl(alkane) carboxylic acids are disclosed in U.S. Pat. Nos. 3,988,363; 3,862,130; and esters of 2-methyl-4-tert-butyl-5-hydroxyphenylalkane carboxylic acids are set forth in European Pat. No. 0,048,841.

The efficacy of the phenolic stabilizers can frequently be increased still further by adding specific compounds which in most cases contain sulfur or phosphorus. The optimum quantitative ratio of stabilizer and synergist is always to be found empirically in the individual instance.

The stabilizers as well as the synergists must meet the criteria that they can be incorporated without difficulties into the various polymers without decomposing, and that they can be distributed therein with maximum uniformity. On the other hand, the polymer should, at the required high incorporation temperatures, neither be discolored by additives nor suffer molecular weight degradation due to temperature load and shear stress.

SUMMARY OF THE INVENTION

It is thus an object of this invention to provide such new stabilizers, their preparation and their use.

Upon further study of the specification and appended claims, further objects and advantages of this invention will become apparent to those skilled in the art.

These objects have been achieved by providing esters of 3-tert-butyl- or 3-tert-butyl-5-alkyl-4-hydroxyphenyl(alkane) carboxylic acids of Formula I

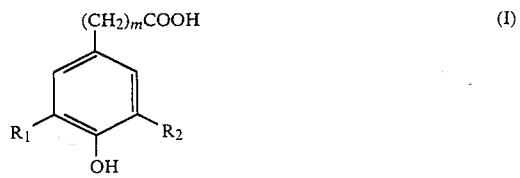

wherein
$R_1 = -C(CH_3)_3$,
$R_2 = H$, $C_1$- to $C_4$-alkyl, e.g., methyl, ethyl, n-propyl, isopropyl, n-butyl, sec.butyl, isobutyl and tert.butyl, preferably $-C(CH_3)_3$,
$m = 0$ to 4, preferably 2,
with oxethylates of polyhydroxyaromatics of 2–6 hydroxy groups of general Formulae II or III, preferably of Formula II and preferably with one alkylenoxide unit per hydroxy group, containing maximally 6 alkylene oxide units,

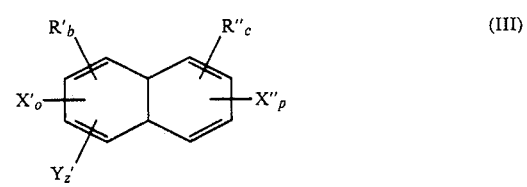

wherein
$X = (CH_2)_q OH$
$X' = (CH_2)_r OH$
$X'' = (CH_2)_s OH$, q, r, s can be 0 or 1, preferably 0,
$R, R', R'' = H$, alkyl, halogen, preferably chlorine,

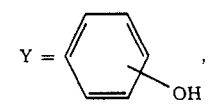

preferably 4-hydroxyphenyl,
$n = 2$ to 6 for z or $z' = 0$, preferably 2 or 3, and
$n = 1$ to 5 for z or $z' \neq 0$, preferably 2 or 3,
$o + p = n$ $0 \leq a, z \leq a+z \leq 6-n$ (in Formula II)

$0 \leq b, c, z' \leq 4 \leq 8-n$ (in Formula III)

and the use of such esters for the stabilization of organic polymers, preferably polyolefins.

There, thus, can be obtained, starting with the acids per se or their derivatives, preferably 3,5-di-tert-butyl-4-hydroxy-phenylpropionic acid (derivatives), esters of these 3-tert-butyl- and 3-tert-butyl-5-alkyl-4-hydroxyphenyl(alkane) carboxylic acids of Formula I having improved stabilizer properties, by reacting with selected alcohols that are preparable economically. This is also attained by incorporation of these esters into organic polymers, preferably into polypropylene and polyethylene. The result is a good stabilization of such polymers with respect to molecular weight degradation during processing or during usage over a relatively discoloration, as a consequence of the stabilizer addition, under these stresses.

These objects have also been attained surprisingly by converting the readily accessible oxethylates of polyhydroxyaromatics with 2-6, preferably 2 or 3, hydroxy groups, of general Formulae II and III, preferably of Formula II, and with preferably one alkylene oxide unit per hydroxy group, into esters of 3-tert-butyl- or 3-tert-butyl-5-alkyl-4-hydroxyphenyl(alkane) carboxylic acids; and utilizing these esters which contain the (poly-)oxethylates as the alcohol component for the stabilization of organic polymers, preferably of polyolefins. Esters are used preferably wherein all of the hydroxy groups of the polyhydroxyaromatics have been oxethylated with an alkylene oxide, preferably ethylene oxide, and wherein all of the thus-produced 2-hydroxy-(2-alkyl)ethyl ether groups have been esterified. Quite especially preferred are esters of 3-(3,5-di-tert-butyl-4-hydroxyphenyl)propionic acid with poly(monooxethylates)[poly(2-hydroxyethyl ethers)] of polyhydroxyaromatics of Formulae II and III.

Typically, R, R' and R'' alkyl groups are of 1-4 C-atoms, e.g., as exemplified above and haloatoms are Br or Cl.

This way of solving the problem is extraordinarily surprising inasmuch as it is expected that the ready attack of oxygen at the primary and secondary carbon atoms proximate to the ether bond would rapidly lead, especially in the case of ethers containing alkyl(ene) residues, to the formation of hydroperoxides. These frequently disintegrate even at only somewhat elevated temperatures and necessitate careful purification procedures to remove such hydroperoxides prior to the use of the ethers (cf. Houben-Weyl, "Methoden der organ. Chemie" [Methods or Organic Chemistry] vol. VI/3). Therefore, it could not be expected that it would be possible to obtain with the esters according to this invention, stabilizers which can be mixed at the high temperatures of polyolefin processing, which have good efficacy and which cause a surprisingly low degree of discoloration of the polymer materials treated with them. This is even more surprising since commercially available esters of dialkyl 4-hydroxyphenylalkane carboxylic acids with ether-group-containing alpha, omega-bishydroxyethyl(poly)oxaalkanes of Formula VI

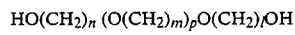  (VI)

with m,n,1=2 and p≧0, producible pursuant to the state of the art, for example according to U.S. Pat. No. 3,285,855, lead to discolorations in polyolefins, so that products of this type are not recommended for this important field of application.

The beneficial effect of the esters of this invention as stabilizers for polymers, preferably polyolefins, is also astonishing for an additional reason. Polyhydroxyaromatics of Formula II wherein q=0 and z=0 are, on the one hand, are utilized as antioxidants, as demonstrated by the examples of hydroquinone, hydroquinone monoalkyl ethers, or hydroxyhydroquinone. Whereas, on the other hand, such compounds are, in part, extraordinarily strong reducing agents so that, for example, pyrogallol and hydroxyhydroquinone in an alkaline solution are utilized as absorbents for oxygen, which latter immediately brings about a reaction to form intensely colored, insoluble secondary products (cf. Ullman, Enzyklopädie der. Techn. Chemie [Encyclopedia of Industrial Chemistry] 18: 222 et seq. [1979]). Other polyhydroxyaromatics, such as phloroglucinol, exhibit, as set forth in the literature, a light sensitivity of a level that cannot be ignored. Therefore, it could not be readily expected that it is possible to obtain from such compounds, sensitive to various influences, highly efficacious stabilizers by the incorporation of ether bonds and esterification of the poly(ether alcohols), the handling of which stabilizers causes no problems whatsoever and which stabilizers are substantially more efficacious than the polyhydroxyaromatics on which they are based.

The esters to be used according to this invention as stabilizers preferably in polypropylene and polyethylene are novel compounds. Representative melting points and spectroscopic analyses are shown in the examples. Such crystalline compounds are preferred over liquid stabilizers since their uniform distribution in the polymer and the continuous addition of the required small quantities generally pose lesser difficulties.

The esters of this invention, can be produced according to methods known per se by reacting the carboxylic acids and/or suitable reactive acid derivatives with the polyfunctional alcohols accessible by oxethylation of the aforementioned starting materials. These alcohols should contain at least two, preferably 2, alkylene oxide units, i.e. they should exhibit at least two ether bridges, wherein these ether bridges should originate from 2 different hydroxyaryl groups. The conventional processes of the prior art can also be utilized for the oxethylation (cf., for example, M. J. Schick, "Nonionic Surfactants", Marcel Dekker, New York [1967] I: 57 et seq.), according to which alkylene oxides of Formula V

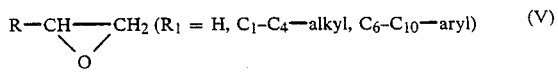  (V)

are chemically added to the corresponding starting compounds of Formula II or III. Typical $R_1$ alkyl groups are as exemplified above and typical aryl groups are phenyl and naphthyl.

Addition products of ethylene oxide, i.e. R=H in Formula V, are preferred as starting materials for the esters of 3-tert-butyl- or 3-tert-butyl-5-alkyl-4-hydroxyphenyl(alkane) carboxylic acids of this invention. Especially suitable are oxethylates of polyhydroxyaromatics of Formulae II and III containing an ethylene oxide unit (as the 2-hydroxyethoxy group) per hydroxy group of the polyhydroxyaromatics, preferably those of Formula II with 2 or 3 hydroxy groups, such as the compounds mentioned in the literature, pyrogallol trioxethylate (bp 235°–240°/1.5 mbar) (as disclosed in French Pat. No. 1,167,412, Rhone-Poulenc) or 1,3,5-phloroglucinol trioxethylate (French Pat. No. 1,596,552, Eastman Kodak). Eminently suitable are bis(monooxethylates) of hydroquinone, of resorcinol, of 2,6- and 1,5-naphthalenediol, of 4,4'-dihydroxybiphenyl, of 2,2'-dihydroxybiphenyl, of 2,3,5,6-tetrachlorohydroquinone, as well as the tris(monooxethylate) of phloroglucinol, i.e. 1,4- and 1,3-bis(2-hydroxyethoxy)benzene, 1,5-bis-(2-hydroxyethoxy)naphthalene, 4,4'- and 2,2'-bis(2-hydroxyethoxy)biphenyl, 1,4-bis(2-hydroxyethoxy)-2,3,5,6-tetrachlorobenzene, and 1,3,5-tris(2-hydroxyethoxy) benzene. Quite especially preferred precursors are those containing more than one monooxethylate, i.e., poly(monooxethylates), of polyhydroxyaromatics wherein all of the phenolic hydroxy groups have been converted, by treatment with ethylene oxide, into 2-hydroxyethyl ether substituents. Such poly(2-hydroxyethyloxa)aromatics have not previously been disclosed for all of the polyhydroxyaromatics corresponding to Formulae II and III. Separation of the desired poly(monooxethylates) from by-products that may have been formed during the oxethylation, for example, polyglycols or higher oxethylates, can take place according to known methods of the state of the art, e.g., by crystallization from suitable solvents (such as alcohols or ethers), by column chromatography or—in individual cases—by distillation under reduced pressure.

The esters of this invention can be prepared in an especially simple way by interesterifying the poly(monooxethylates) with esters of 3-tert-butyl- or 3-tert-butyl-5-alkyl-4-hydroxyphenyl(alkane) carboxylic acids of Formula I, preferably with esters of 3,5-di-tert-butyl-4-hydroxyphenylpropionic acid, which contain alkoxy groups of 1-4 carbon atoms, with liberation and removal of the more readily volatile alcohols.

The interesterification is generally conducted at an elevated temperature, preferably below 120° C. Frequently, reaction of polyol and lower alkyl ester without other components is the most economical route, but it is also possible to operate in the presence of inert solvents and/or azeotropic agents in order to separate the released alcohol. For accelerating the interesterification, use is made of (preferably alkaline or neutral) catalysts of the state of the art, such as, sodium methylate, lithium amide, potassium tert-butylate, titanium tetrabutylate, aluminum triisopropylate. These are added generally in amounts of 0.1–5% by weight, based on the weight of the reaction mixture, amounts of 0.5–1.5% by weight being preferred for reasons of reaction rate and costs.

Suitably, the interesterification is performed under an inert gas or under reduced pressure in order to avoid oxidations of starting materials and reaction products and in order to maintain a low level of thermal load on the reaction mixture, above all in the presence of the interesterification catalysts.

It is advantageous to utilize one of the starting materials in a 10–20% molar excess over the required stoichiometric quantity. The reaction is interrupted as soon as analysis of the reaction mixture or weighing of the separated alcohol indicates an extensive (or complete) consumption of the component used in less than stoichiometric amounts. For this purpose, the catalyst is deactivated (i.e., in case of alkaline or neutral catalysts, for example, destroyed by adding an equivalent amount of acid), the reaction mixture is worked up, the polyol esters are purified by recrystallization from suitable solvents, such as, alcohols, ethers or aromatic hydrocarbons. Subsequently, the constitution of the compounds is confirmed by $^1$H NMR spectroscopy based on the position and intensity of the various signals.

The 3-tert-butyl- and 3-tert-butyl-5-alkyl-4-hydroxyphenyl(alkane) carboxylic acid esters of poly(2-hydroxyethyloxa)- and poly(2-hydroxyethyloxamethyl)aromatics of this invention are valuable stabilizers for polymers, preferably for (co)polymers of mono- and/or diolefins, especially of polypropylene and polyethylene. They can be used as processing stabilizers, but likewise as long-term stabilizers. Mixing into the polymers can take place by means of conventional prior-art methods by mixing the pulverulent polymers with the stabilizers or with a stabilizer concentrate (in the respective polymer). The stabilizer addition, however, can also be introduced into a suspension, emulsion or solution of the polymers prior to the working-up step. The stabilizers are generally employed in amounts of about 0.02–3% by weight of the material to be stabilized, but the optimum amount, readily determinable by one skilled in the art, varies in dependence on the polymer to be stabilized and on the type of stress to which the polymer will be subjected. An advantageous range is 0.05–2% by weight of stabilizer addition; quite especially favorable in the case of polyolefins are additions of 0.1–1% by weight. In this connection, it is possible selectively to add individual esters, but also mixtures of several esters. Furthermore, various other additives can be additionally incorporated into the polymers, such as, organic compounds containing sulfur and/or phosphorus, as synergists, but also stabilizers not in accordance with this invention, plasticizers, pigments, UV stabilizers, antistats, fillers and/or processing aids, such as calcium stearate. They are used fully conventionally, e.g., as discussed in R. Gäehler, H. Müller. "Taschenbuch der Kunslsloff-Additive (Pocket Manuel of Plastics Additives)", C. Hanser publishers, Munich/Vienna (1979).

The stabilization according to this invention of polymers that, in case of the polyolefins, can be made into finished parts of versatile uses by means of the injection molding or extrusion techniques will be described in greater detail by the examples set forth below.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

EXAMPLE 1

Preparation of
Bis[3-(3,5-di-tert-butyl-4-hydroxyphenyl)propionic
Acid) Ester of 1,4-Bis(2-hydroxyethoxy)benzene In a three-necked flask equipped with internal thermometer, magnetic stirrer and Liebig condenser, 0.28 mol (55.5 g) of commercially available 1,4-bis(2-hydroxyethoxy)benzene (Kodak; Eastman Chem. Div.) is combined with about 0.60 mol (176 g) of 3-(3,5-di-tert-butyl-4-hydroxyphenyl)propionic acid methyl ester and with 0.076 mol (4.1 g) of sodium methylate. Under an inert gas, the reaction mixture is heated in the apparatus under exclusion of moisture to about 110° C. After about one hour's reaction period, the pressure is reduced stepwise to about 0.2 hPa (mbar). Methanol removed by distillation is condensed and weighed in order to assess the attained conversion during the interesterification which takes about 5 hours. The content of the three-necked flask is taken up in about 300 ml of toluene, an amount of glacial acetic acid (5% excess) is added which is approximately equivalent to the sodium methylate catalyst, and the toluene solution is subsequently washed with sodium bicarbonate solution and water. After filtration, drying of the filtrate, and evaporation of the toluene under reduced pressure, there is separated from the viscous distillation residue unreacted and/or excess 3-(3,5-di-tert-butyl-4-hydroxyphenyl)-propionic acid methyl ester (bp about 130°/0.05 hPa [mbar]) under vacuum. The nonvolatile proportions of the reaction mixture consist predominantly of the bis[3-(3,5-di-tert-butyl-4-hydroxyphenyl)propionic acid ester of the 1,4-bis(2-hydroxyethoxy)benzene utilized. By adding a small amount of low-boiling petroleum ether, this ester can be made to crystallize. The thus-obtained crude product is purified by recrystallization from tetrahydrofuran/ethanol until the melting point remains constant; the thereby attained purity is checked by thin-layer chromatography (abbreviation TLC).

Yield: 81 g of ester according to this invention (=40% of theory), mp 133°–135° C.; purity (as per TLC) 97%.

The constitution of the compound is confirmed by intensity and position of the absorption lines of the $^1$H NMR spectrum. [Compare Table I, containing more detailed data on the spectra of the esters of this invention, taken in CDCl$_3$ (with TMS [tetramethylsilane] as the internal standard).]

1.2 Preparation of
Bis[3-(3,5-di-tert-butyl-4-hydroxyphenyl)propionic
Acid) Ester of 1,4-Bis(2-hydroxyethoxy)benzene Example 1 is repeated, with the difference that 0.01 mol (3.13 g) of titanium tetrabutylate is used in place of sodium methylate. After a similar working-up operation, the diester of this invention is obtained.

Yield: 140.3 g (=70% of theory),
mp 134°–135° C. (from ethanol).

EXAMPLE 2

2.1 Preparation of 1,3-Bis(2-hydroxyethoxy)benzene
(Not According to Invention)

Resorcinol (1,3-dihydroxybenzene) is reacted for the oxethylation of phenols (cf., for example, M. J. Schick, loc. cit.) in the presence of sodium hydroxide with ethylene oxide. During this step, a solution of 4.5 mol (496 g) of resorcinol is made to react in 350 g of diethylene glycol dimethyl ether under pressure with ethylene oxide until 2 mol of ethylene oxide has been absorbed per mol of resorcinol. After cooling, neutralization of the catalyst used with an equivalent amount of glacial acetic acid, and evaporation of part of the solvent, a reddish crystal cake is formed after standing for a relatively long period of time at 0° C. From this crude product, almost colorless crystals are obtained after recrystallization from methanol.

Yield: 457 g (=51% of theory) of 1,3-bis(2-hydroxyethoxy)benzene, mp 89°–91° C. (from methanol).

The constitution of the diol is confirmed by the $^1$H NMR spectrum.

2.2 Preparation of the
Bis[3-(3,5-di-tert-butyl-4-hydroxyphenyl)propionic
Acid] Ester of 1,3-Bis(2-hydroxyethoxy)benzene In accordance with the method described in Example 1, 0.28 mol (55.5 g) of 1,3-bis(2-hydroxyethoxy)benzene is interesterified within 5 hours in the presence of 0.076 mol (4.1 g) of sodium methylate with 0.6 mol (175.5 g) of 3-(3,5-di-tert-butyl-4-hydroxyphenyl)propionic acid methyl ester. After the reaction mixture has been worked up and unreacted or excess starting materials have been removed under reduced pressure, there remains a viscous oil which solidifies after cooling and adding petroleum ether. Recrystallization from methanol yields the bis ester of this invention. The constitution of the latter is confirmed by the $^1$H NMR spectrum (cf. Table I).

Yield: 145 g (=72% of theory),
mp 85°–86° C.; purity 98% (as per TLC).

EXAMPLE 3

3.1 Preparation of
1,5-Bis(2-hydroxyethoxy)naphthalene (Not According
to Invention)

In accordance with the mode of operation described in Example 2.1, 2.0 mol (322 g) of 1,5-naphthalenediol, dissolved in 1,160 g of diethylene glycol dimethyl ether, is converted into the 1,5-bis(2-hydroxyethoxy)naphthalene with ethylene oxide in the presence of catalytic amounts of sodium hydroxide. The resultant crude product is freed of adhering impurities by recrystallization (from butanol).

Yield: 290 g (=71% of theory) of 1,5-bis(2-hydroxyethoxy)naphthalene, mp 172°–174° C., purity about 90% (as per $^1$H NMR spectrum).

The $^1$H NMR spectrum confirms the constitution of the diol.

3.2 Di[3-(3,5-di-tert-butyl-4-hydroxyphenyl)propionic
Acid] Ester of 1,5-Bis(2-hydroxyethoxy)naphthalene In the same way as described in Example 1, 0.27 mol (67 g) of 1,5-bis(2-hydroxyethoxy)naphthalene is interesterified in the presence of 0.076 mol (4.1 g) of sodium methylate with 0.58 mol (169.6 g) of 3-(3,5-di-tert-butyl-4-hydroxyphenyl)propionic acid methyl ester. After the resultant nonvolatile residue has been analogously worked up and recrystallized from toluene, the diester of 1,5-bis(2-hydroxyethoxy)naphthalene according to this invention is obtained in the form of colorless crystals.

Yield: 144 g (=70% of theory), mp 161°–163° C. (from toluene); purity about 90% (as per $^1$H NMR).

The constitution of the diester is confirmed by the position and intensity of the absorption lines of the $^1$H NMR spectrum. (Compare Table I regarding detailed data.)

3.3 Di[3-(3,5-di-tert-butyl-4-hydroxyphenyl)propionic Acid] Ester of 1,5-Bis(2-hydroxyethoxy)naphthalene Example 3.2 is repeated, with the difference that 0.02 mol (6.2 g) of titanium tetrabutylate is used as the interesterification catalyst in place of sodium methylate. After conducting an analogous working up operation, the diester of this invention is obtained.

Yield: 148 g (=72% of theory), mp 156°-158° C.

EXAMPLE 4

4.1 Preparation of 4,4'-Bis(2-hydroxyethoxy)biphenyl (Not According to Invention)

1.5 mol (280 g) of 4,4'-dihydroxybiphenyl is dissolved in 1,263 g of diethylene glycol dimethyl ether and, after adding catalytic amounts of sodium hydroxide, oxethylated with ethylene oxide in the manner described in Example 2.1 at 170° C. to obtain 4,4'-bis(2-hydroxyethoxy)biphenyl. After subjecting the reaction mixture to an analogous working up step, the diol is obtained, mp 201°-202° C. (from tetrahydrofuran/cyclohexanone). The $^1$H NMR spectrum confirms the constitution of the diol.

Yield: 255 g (=62% of theory). purity more than 90%(as per $^1$H NMR spectrum).

4.2 Di[3-(3,5-di-tert-butyl-4-hydroxyphenyl)propionic Acid] Ester of 4,4'-Bis(2-hydroxyethoxy)biphenyl In accordance with the method described in Example 1, 0.28 mol (75.9 g) of 4,4'-bis(2-hydroxyethoxy)biphenyl is interesterified with 0.58 mol (169.6 g) of 3-(3,5-di-tert-butyl-4-hydroxyphenyl)propionic acid methyl ester with the addition of 0.076 mol (4.1 g) of sodium methylate. After 6 hours of reaction at 150° C. while removing the thus-liberated methanol, the mixture is worked up analogously to Example 1, the nonvolatile residue is made to crystallize, and the crude product is purified by recrystallization.

Yield: 147 g (=67% of theory), mp 111°-112.5° C. (from ethanol), purity 93% (as per TLC).

The $^1$H NMR spectrum confirms the constitution of the diester of this invention (cf. Table I).

EXAMPLE 5

5.1 Preparation of 2,2'-Bis(2-hydroxyethoxy)biphenyl (Not According to Invention)

Example 4.1 is repeated, with the difference that, instead of 4,4'-dihydroxybiphenyl, 2,2'-dihydroxybiphenyl, likewise commercially available, is oxethylated with ethylene oxide to 2,2'-bis(2-hydroxyethoxy)biphenyl. The $^1$H NMR spectrum confirms the constitution of the diol.

Yield: 68% of theory, mp 56°-57° C. (from diethyl ether), purity about 90% (as per $^1$H NMR spectrum).

5.2 Di[3-(3,5-di-tert-butyl-4-hydroxyphenyl)propionic Acid] Ester of 2,2'-Bis(2-hydroxyethoxy)biphenyl Example 4.2 is repeated, but using as the starting material, in place of 4,4'-bis(2-hydroxyethoxy)biphenyl, the isomeric compound 2,2'-bis(2-hydroxyethoxy)biphenyl. After conducting the reaction analogously and working up the reaction mixture, the diol diester of this invention can be isolated. The $^1$H NMR spectrum confirms the constitution of the novel compound of this invention (cf. Table I).

Yield: 86 g (=61% of theory), mp 94°-95° C. (from ethanol).

EXAMPLES 6-10 (ACCORDING TO INVENTION) AS WELL AS EXAMPLES 11-14 (COMPARATIVE TESTS)

2 kg of polypropylene powder is combined with 0.1% by weight of the stabilizers set forth in Table II (esters of this invention according to Examples 1-5) and, respectively, stabilizers according to the state of the art (Examples 11-14), using 0.1% by weight of calcium stearate as the processing aid, and also with the amounts indicated in Table II of bis(octadecyl)thiodipropionic acid ester and optionally of tris(2,4-di-tert-butylphenyl)phosphite, and mixed at room temperature in a mixing unit (e.g. a fluid mixer by the Papenmeier company). The resultant powder mixtures are extruded at 100 rpm and maximally 230° C. by means of an extruder (Tröster company, d=30 mm, 1=20 d) and subsequently granulated. The granulated material is press-molded at 120° C. into plates having a thickness of 1 mm, and from these, polyolefin strips are punched out having the dimensions of 1×10×100 mm. The latter are stored unsupported in a suitable device at 145° C. in a recirculating air dryer with access of air until observation shows, as an indication of the onset of brittleness, a crumbling of the test specimens and/or a crack formation in these specimens. Table II contains the results.

It can be seen from the stability of stabilized polypropylene specimens determined at 145° C. that the effect of the esters to be incorporated according to this invention attains or surpasses the level of specimens to which state of the art stabilizers were added.

EXAMPLES 15-21 (Examples 20 and 21 Not According to Invention)

Polypropylene powder containing stabilizers of this invention and, respectively, stabilizers according to the state of the art, prepared as described in Examples 6-10, as well as 12-14, was repeatedly extruded by means of an extruder (Brabender company; d=19 mm, 1=20 d)(at 30 rpm and a temperature of maximally 270° C.). A check was made with the aid of the $I_5$ values (at 190° C.), measured after each extrusion pass, as to the extent to which molecular weight degradation of the polypropylene occurred during processing. Table III contains the thus-determined $I_5$ values.

It can be seen from the examples that by using the stabilizers according to this invention (compare Examples 15-19), the state of the art presented by Comparative Examples 20 and 21 is, in most cases, attained and—depending on the comparative example—surpassed. A like behavior can be observed when adding small amounts of synergists [0.1% by weight of bis(octadecyl)thiodipropionic acid ester and, respectively, tris(2,4-di-tert-butylphenyl)phosphite].

EXAMPLES 22-29 (Examples 27-29 Not According to Invention)

Granulated polypropylene containing 0.1% by weight of stabilizers of this invention (according to Examples 1-5) and produced according to Examples 6-10, to which had been added 0.1% by weight of calcium stearate as a processing aid, was press-molded into plates (dimensions 4×10×100 mm) at 210° C. These plates were stored for 4 weeks at 100° C. and then visually evaluated with respect to possible color changes. The comparison specimens were analogously produced polypropylene plates aged at 100° C. and containing stabilizers of the state of the art Examples 27–29: mono-, bis- and tetra[3-(3,5-di-tert-butyl-4-hydroxyphenyl)propionic acid] esters of octadecanol (Example 27), of thiodiethanol (Example 28), and of pentaerythritol (Example 29)]. The visually determined color impressions, compiled in Table IV, are based on Comparative Example 29.

It can be seen from the test results that—with one exception—the level of the state of the art is attained by the stabilizers of the present invention and, respectively—with the choice of another reference substance—surpassed, in all instances.

TABLE IV

| Example No. | Polypropylene According to Example No. | | Color Evaluation (*) (After 28 Days at 100° C.) |
|---|---|---|---|
| 22 | 6 | | — |
| 23 | 7 | | 0 |
| 24 | 8 | | 0 |
| 25 | 9 | | 0 |
| 26 | 10 | | 0 |
| 27 | 12 | State | (+) |
| 28 | 13 | of the | — — |
| 29 | 14 | Art | 0 |

(*) Evaluation:
0 As good as stabilization according to Example 29
(+)/(−) Somewhat better/poorer than stabilization according to Example 29
+/− Better/poorer than stabilization according to Example 29
++/−− Substantially better/poorer than stabilization according to Example 29

TABLE I $^1$H NMR Spectra of 3-(3,5-di-tert-butyl-4-hyroxyphenyl)propionic Acid Esters of Oxethylates of Various Polyhydroxyaromatics

| Ester Acc. to Example No. | Resonance Lines of $^1$H NMR Spectra (*) (in ppm) (Correlation as Per Structural Formula (**) of the Invention) | | | | | | | | of the Esters | |
|---|---|---|---|---|---|---|---|---|---|---|
| | 1 | 2 | 3 | 4 | 5 | 6 | 7 | 8 | 9 | 10 |
| 1 | 7.00 (4) | 5.08 (2) | 4.42 (4) | 4.11 (4) | 2.89 (4) | 2.65 (4) | 1.43 (36) | | | 6.84 (4) |
| 2 | 6.99 (4) | 5.08 (2) | 4.41 (4) | 4.10 (4) | 2.88 (4) | 2.65 (4) | 1.41 (36) | | 7.15 (1) | 6.50 (3) |
| 3 | 6.99 (4) | 5.07 (2) | 4.58 (4) | 4.32 (4) | 2.90 (4) | 2.67 (4) | 1.42 (36) | 7.87 (2) | 7.35 (2) | 6.83 (2) |
| 4 | 6.99 (4) | 5.85 (2) | 4.41 (4) | 4.22 (4) | 2.85 (4) | 2.61 (4) | 1.40 (36) | | 7.51 (4) | 7.05 (4) |
| 5 | 6.97 (4) | 5.08 (2) | 4.27 (4) | 4.11 (4) | 2.78 (4) | 2.51 (4) | 1.42 (36) | | 7.27 (4) | 6.98 (4) |

Explanations (*) Measured in CDCl$_3$ against tetramethylsilane (internal); concentration about 20 vol-%; the above data are the signal positions in ppm (with tetramethylsilane being 0 ppm) and the number of associated H atoms (in each case in parentheses)

(**) Correlation of Signals:

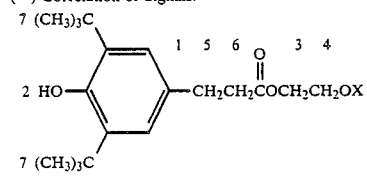

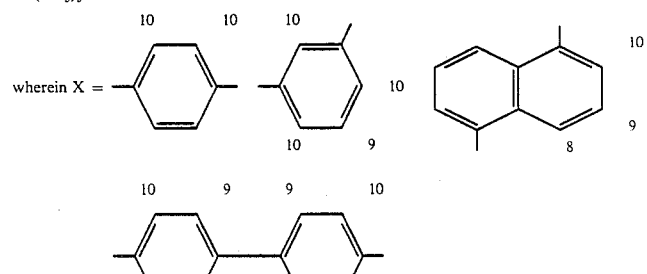

TABLE II:

Aging Tests at 145° C. with Addition of Stabilizers According to Invention to Polypropylene

| Example No. | Stabilizer of Example No. | Stabilizer Formulae | Aging Resistance at 145° C. (Days) A* | B* | C* |
|---|---|---|---|---|---|
| 6 | 1 | 3,5-di-tert-butyl-4-hydroxyphenyl propionate ester with ethylene glycol mono(4-hydroxyphenyl) ether (Abk. = X) | 11 | 38 | 35 |
| 7 | 2 | X—OCH$_2$CH$_2$O—(1,3-phenylene)—OCH$_2$CH$_2$O—X | 20 | 37 | 40 |
| 8 | 3 | X—OCH$_2$CH$_2$O—(1,5-naphthalene)—OCH$_2$CH$_2$O—X | 17 | 40 | 37 |
| 9 | 4 | X—OCH$_2$CH$_2$O—(4,4'-biphenylene)—OCH$_2$CH$_2$O—X | 18 | 41 | 43 |
| 10 | 5 | X—CH$_2$CH$_2$O—(2,2'-biphenylene)—OCH$_2$CH$_2$O—X | 19 | 35 | 38 |
| 11 | Tests Not According to Invention | 2,6-di-tert-butyl-4-methylphenol | 2 | 7 | 7 |
| 12 | | C$_{18}$H$_{37}$O—X | 7 | 11 | 11 |
| 13 | | X—OCH$_2$CH$_2$SCH$_2$CH$_2$O—X | 11 | 18 | 27 |
| 14 | | C(CH$_2$O—X)$_4$ | 27 | 43 | 47 |

*A = 0.1% by weight of antioxidant as an additive
B = same as A and additionally 0.1% by weight of bis(octadecyl)thiodipropionic acid ester
C = same as B and additionally 0.1% by weight of tris(2,4-di-tert-butylphenyl)phosphite

TABLE III

Repeated Extrusion of Stabilized Polypropylene Specimens

| | | MFI Values (g/10 min) After Repeated Extrusion | | | | | | | | | |
|---|---|---|---|---|---|---|---|---|---|---|---|
| | Polypropylene (Stabilizer) | Without Adding Synergists (*) | | | | | With Addition of Synergists (**) | | | | |
| Example No. | According to Example No. | 0× | 1× | 2× | 3× | 4× | 0× | 1× | 2× | 3× | 4× |
| 15 | 6 (1) | 5.2 | 13 | 20 | 25 | 32 | 4.6 | 9.9 | 15 | 22 | 29 |
| 16 | 7 (2) | 3.9 | 16 | 27 | 39 | 51 | 3.9 | 6.2 | 8.3 | 11 | 14 |
| 17 | 8 (3) | 5.3 | 15 | 21 | 24 | 33 | 3.7 | 7.0 | 9.5 | 13 | 17 |
| 18 | 9 (4) | 4.2 | 14 | 21 | 28 | 39 | 3.4 | 6.2 | 8.9 | 13 | 16 |
| 19 | 10 (5) | 4.1 | 13 | 20 | 28 | 39 | 3.6 | 6.0 | 7.9 | 10 | 14 |
| 20 | 12 Comp. Test | 6.3 | 25 | 37 | 53 | 76 | 3.6 | 7.7 | 11 | 15 | 21 |
| 21 | 14 (State of | 4.8 | 13 | 19 | 26 | 30 | 3.6 | 6.4 | 9.3 | 12 | 16 |

TABLE III-continued

Repeated Extrusion of Stabilized Polypropylene Specimens

| Example No. | Polypropylene (Stabilizer) According to Example No. the Art) | MFI Values (g/10 min) After Repeated Extrusion | | | | | | | | | |
|---|---|---|---|---|---|---|---|---|---|---|---|
| | | Without Adding Synergists (*) | | | | | With Addition of Synergists (**) | | | | |
| | | 0 × | 1 × | 2 × | 3 × | 4 × | 0 × | 1 × | 2 × | 3 × | 4 × |

(*) Specimens with 0.1% by weight of stabilizer and 0.1% by weight of calcium stearate.
(**) Specimens contain additionally 0.1% by weight of bis(octadecyl)thiodipropionic acid ester and 0.1% by weight of tris(2,4-di-tert-butylphenyl)phosphite.

EXAMPLE 30

30.1 Preparation of 1,4-Bis(2-hydroxyethoxy)-2,3,5,6-tetrachlorobenzene (Not According to Invention)

Pursuant to the method described in Example 2.1, 1.62 mol (414 g) of 2,3,5,6-tetrachlorohydroquinone, dissolved in 829 g of diethylene glycol dimethyl ether, is converted into 1,4-bis(2-hydroxyethoxy)-2,3,5,6-tetrachlorobenzene in the presence of catalytic amounts of sodium hydroxide with the use of ethylene oxide. The resultant crude product is freed of adhering impurities by recrystallization from dioxane.

Melting point: 148°–151° C.

The constitution of the compound is confirmed by the $^1$H NMR spectrum.

30.2 Preparation of the Bis[3-(3,5-di-tert-butyl-4-hydroxyphenyl)propionic Acid] Ester of 1,4-Bis(2-hydroxyethoxy)-2,3,5,6-tetrachlorobenzene In accordance with the mode of operation disclosed in Example 1, 0.076 mol (25.54 g) of 1,4-bis(2-hydroxyethoxy)-2,3,5,6-tetrachlorobenzene is interesterified within 10 hours in the presence of 0.01 mol (3.8 g) of titanium tetrabutylate with 0.21 mol (62 g) of 3-(3,5-di-tert-butyl-4-hydroxyphenyl)propionic acid methyl ester. After the reaction mixture has been worked up and unreacted or excess starting materials have been removed under reduced pressure, a viscous oil remains which solidifies after cooling and addition of petroleum ether.

Melting point: 102°–103° C. (purity higher than 95% as per $^1$H NMR).

The constitution of the ester is confirmed by position and intensity of the absorption lines of the $^1$H NMR spectrum. Resonance lines in ppm/correlation analogous to structural formula Table I (**)
1: 7.01 (4) 2: 5.08 (2) 3: 4.49 (4) 4: 4.23 (4) 5: 2.91 (4) 6: 2.68 (4) 7: 1.43 (36)

From the $^1$H NMR spectrum of the ester analyzed, the purity of the bis ester can be assessed to be ≧95%.

EXAMPLE 31

31.1 Preparation of 2,6-Bis(2-hydroxyethoxy)naphthalene (Not According to Invention)

Following the method disclosed in Example 2.1, 1.26 mol (202 g) of 1,5-naphthalenediol, dissolved in g of diethylene glycol dimethyl ether, is converted with ethylene oxide into 2,6-bis(2-hydroxyethoxy)naphthalene in the presence of catalytic amounts of sodium hydroxide. The resultant crude product is freed of adhering impurities by recrystallization (from butanol).

Melting point: 179°–181° C.

The $^1$H NMR spectrum confirms the constitution of the diol.

31.2 Di[3-(3,5-di-tert-butyl-4-hydroxyphenyl)propionic Acid] Ester of 2,6-Bis(2-hydroxyethoxy)naphthalene In the same way as described in Example 1, 0.18 mol (44.9 g) of 2,6-bis(2-hydroxyethoxy)naphthalene is interesterified within 8 hours in the presence of 0.01 mol (3.5 g) of titanium tetrabutylate with 0.42 mol (123.4 g) of 3-(3,5-di-tert-butyl-4-hydroxyphenyl)propionic acid methyl ester. After performing analogous working up steps and recrystallization of the thus obtained nonvolatile residue from toluene, the diester of 1,5-bis(2-hydroxyethoxy)naphthalene of this invention is obtained in the form of colorless crystals.

Yield: 148 g (=72% of theory), mp 123°–124° C. (from toluene), purity ≧95% (as per $^1$H NMR).

The constitution of the diester is confirmed by position and intensity of the absorption lines of the $^1$H NMR spectrum. Resonance lines in ppm/correlation analogously to the structural formula, Table 1 (**) wherein

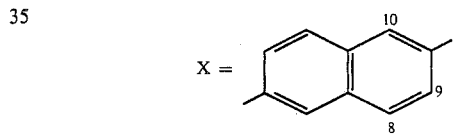

1: 6.90/4 2: 4.9/2 3: 4.4/4 4: 4.2/4 5: 2.8/4 6: 2.6/4 7: 1.4/36 8: 7.5/2 9: 7.02/2 10: 6.97/2

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An ester of a 3-tert-butyl- or 3-tert-butyl-5-alkyl-4-hydroxyphenyl(alkane) carboxylic acid of Formula I

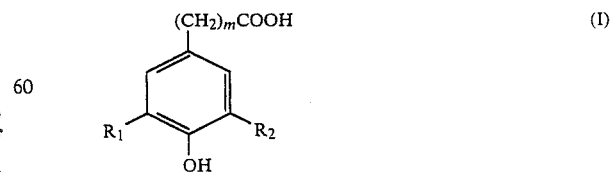

wherein
$R_1 = -C(CH_3)_3$,
$R_2 = H$, $C_1$- to $C_4$-alkyl, and
$m = 0$ to 4, with an oxethylate of a polyhydroxyaromatic group of 2-6 hydroxy groups of Formulae II or III, containing 1-6 oxethylate units,

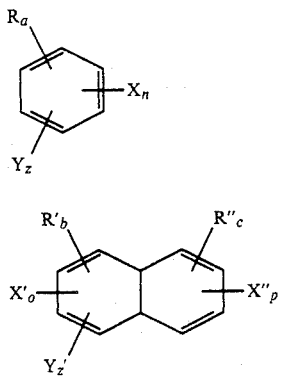

wherein
$X = (CH_2)_q OH$
$X' = (CH_2)_r OH$
$X'' = (CH_2)_s OH$, wherein q, r, s can be 0 or 1, R,R',R''=H, $C_{1-4}$-alkyl or halogen,

n=2 to 6 for z or z'=0, and
n=1 to 5 for z or z'≠0,
o+p=n
$0 \leq a, z \leq a+z \leq 6-n$ (in Formula II)
$0 \leq b, c, z' \leq 4 \leq 8 - n$ (in Formula III)

wherein the oxethylate group(s) are bonded t hydroxy groups of said groups of formulae II or III and are derived from alkylene oxide groups of the formula

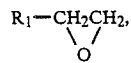

wherein $R_1$ is H, $C_{1-4}$-alkyl or $C_{6-10}$-aryl.

2. An ester of 3-(3,5-di-tert-butyl-4-hydroxyphenyl)-propionic acid of claim 1 of Formula Ia

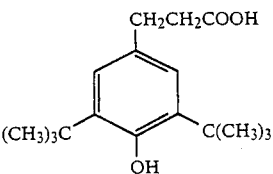

with an oxethylate of a polyhydroxyaromatic of 2-6 hydroxy groups of Formulae II or III.

3. An ester of claim 2, wherein q, r, s=0.
4. An ester of claim 1, wherein $R_2 = -C(CH_3)_3$.
5. An ester of claim 1, wherein m=2.
6. An ester of claim 1, wherein q, r, s=0.
7. An ester of claim 1, wherein n=2 or 3.
8. An ester of claim 1, wherein y=4-hydroxyphenyl.
9. An ester of claim 2, wherein each OH group of the polyhydroxyaromatic of Formulae II or III is oxethylated to a 2-hydroxyethoxy group.
10. An ester of claim 2, wherein each OH group of the polyhydroxyaromatic of Formulae II or III is oxethylated to a 2-hydroxyethoxy group.
11. An ester according to claim 1, wherein said oxethylate is a bis(monooxethylate) of hydroquinone, resorcinol, 2,6- or 1,5-naphthalenediol, 4,4'-dihydroxybiphenyl, 2,2'-dihydroxybiphenyl, or 2,3,5,6-tetrachlorohydroquinone, or a tris(monooxethylate) of phloroglucinol, with 1,4- or 1,3-bis(2-hydroxyethoxy)-benzene, with 2,6- or 1,5-bis(2-hydroxyethoxy)naphthalene, with 4,4'- or 2,2'-bis(2-hydroxyethoxy)biphenyl, or with 1,4-bis(2-hydroxyethoxy)-2,3,5,6-tetrachlorobenzene.
12. An ester according to claim 2, wherein said oxethylate is a bis(monooxethylate) of hydroquinone, resorcinol, 2,6- or 1,5-naphthalenediol, 4,4'-dihydroxybiphenyl, 2,2'-dihydroxybiphenyl, or 2,3,5,6-tetrachlorohydroquinone, or a tris(monooxethylate) of phloroglucinol, with 1,4- or 1,3-bis(2-hydroxyethoxy)-benzene, with 2,6- or 1,5-bis(2-hydroxyethoxy)naphthalene, with 4,4'- or 2,2'-bis(2-hydroxyethoxy)biphenyl, or with 1,4-bis(2-hydroxyethoxy)-2,3,5,6-tetrachlorobenzene.
13. A process for the preparation of an ester of claim 1, comprising catalytically interesterifying the corresponding carboxylic acid with the corresponding oxethylate of the polyhydroxyaromatic.
14. In a composition comprising polymer and an effective amount of a stabilizer, the improvement wherein the stabilizer is a compound of claim 1.
15. A composition of claim 14, wherein the polymer is a polyolefin.
16. A composition of claim 15, wherein the polyolefin is polyethylene or polypropylene.

* * * * *

UNITED STATES PATENT AND TRADEMARK OFFICE
CERTIFICATE OF CORRECTION

PATENT NO. : 4,859,790

DATED : August 22, 1989

INVENTOR(S) : KÜPPER ET AL

It is certified that error appears in the above-identified patent and that said Letters Patent is hereby corrected as shown below:

Column 17, claim 1, line 43:

reads "wherein the oxethylate group(s) are bonded t hy-"

should read -- wherein the oxethylate group(s) are bonded to
        hy- --

Signed and Sealed this

Nineteenth Day of June, 1990

*Attest:*

HARRY F. MANBECK, JR.

*Attesting Officer*     *Commissioner of Patents and Trademarks*